Figure 1:
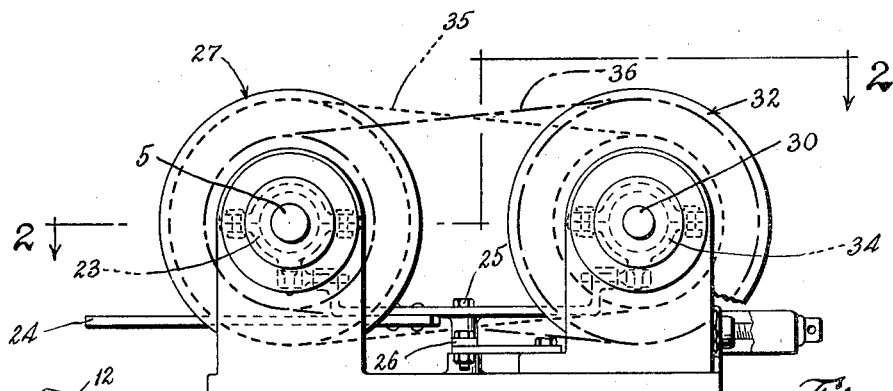

Sept. 3, 1940.　　　　T. YAMANAKA　　　　2,213,778

VARIABLE SPEED APPARATUS

Filed Nov. 26, 1937

INVENTOR.
Toshio Yamanaka
BY Edward M. Kojima
ATTORNEY.

Patented Sept. 3, 1940

2,213,778

UNITED STATES PATENT OFFICE 2,213,778

VARIABLE SPEED APPARATUS

Toshio Yamanaka, Los Angeles, Calif.

Application November 26, 1937, Serial No. 176,498

1 Claim. (Cl. 74—230.21)

This invention relates to and has for an object the provision of a highly efficient change speed transmission mechanism which will provide for a wide range of different speed ratios as desired with constantly driven transmission members such for example as pulleys which may have the diameters of the drum portions thereof increased or decreased over a wide range of sizes at will whereby to vary the driving ratios thereof in a particularly smooth and noiseless manner and to more effectively transmit the power to best meet the load.

An important object is to provide expansible and contractible transmission member of novel and efficient form such as pulleys wherein the cylindrical bodies or drum portion are formed of segments radially movable inwardly and outwardly to change the driving ratio of the pulleys; there being exceptionally efficient means for radially extending the segments and expanding one pulley simultaneously with the radial retraction of the segments of and contracting another pulley and vice versa and for alternately thus expanding and contracting different pairs of a connected group of such pulleys whereby a smooth and efficient change speed transmission having an infinite number of change speed ratios may be provided.

The invention has other objects and advantages, some of which, with the foregoing, will be set forth in the following description of the embodiment of the invention illustrated in the accompanying drawing. It is to be understood however, that variations in said form may be made within the scope of the claim hereto appended.

Figures 3, 4:
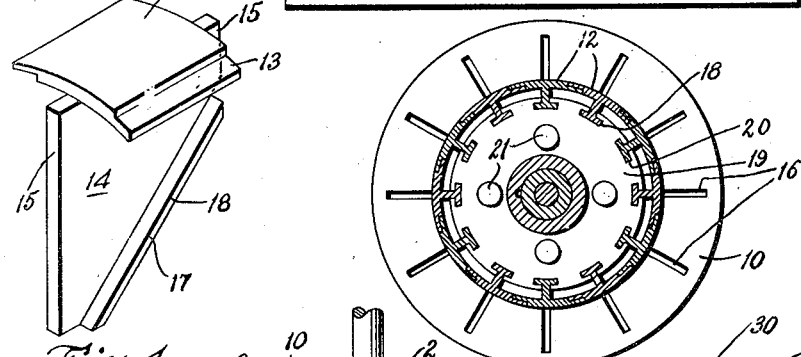
Figure 2:
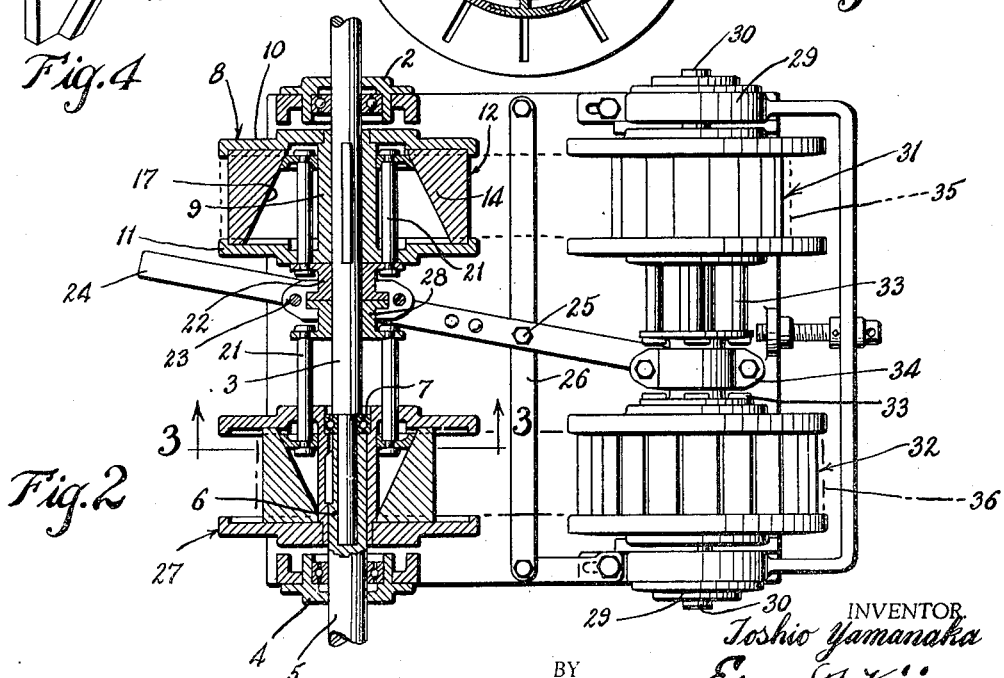

Referring to the drawing:

Fig. 1 is a side elevation of transmission mechanism of this invention, Fig. 2 is a half sectional plan view of the transmission mechanism where the section is taken on the plane of line 2—2 of Fig. 1, Fig. 3 is a vertical section taken on the plane of line 3—3 of Fig. 2, and Fig. 4 is a perspective view of one of the pulley segments or sections.

One form of the many in which my invention may be embodied, as shown in the accompanying drawing comprises a transmission or change speed mechanism consisting of a base or frame 1 having a bearing 2 for a driving shaft 3 and a similar bearing 4 for a driven shaft 5, said shafts being axially alined and one having a bore 6 and bearing 7 receiving an end of the other as shown in Fig. 2.

Keyed to the shaft 3 is a driving member 8 as here shown in the form of a pulley having a hub 9 supporting circular plates 10 and 11 which serves as the sides and flanges of said pulleys. The cylindrical body or drum portion of this pulley is formed of a plurality of arcuate segments 12 having lap joint end portions 13 whereby said segments will fit together as shown in Fig. 3. The opposite side edges of these segments are slidably engaged with the opposed plates 10 and 12 whereas said segments are concentric with the shaft 3. Extending radially inward from the inner faces of and fixed to said segments 12 are vanes 14 of greater width than and extending beyond the side edges of said segments. The radial edges 15 of these vanes are slidable in slots 16 cut in the plates 10 and 11 to hold and guide the segments 12 for radial movement inward and outward, said slots limiting the radial movement of said segments. The inner edges 17 of these vanes 14 are inclined so as to extend obliquely from the hub 9 and have radially extended flanges 18. These inclined edges define a conical opening interiorly of the pulley and in this opening an annular actuating member 19 is movable axially of the hub 9 while slidably engaged with said inclined edges 17 whereby to radially extend and retract the segments 12.

Adjacent to its outer periphery the annular member 19 is formed with T shaped slots 20 in which the edges 17 and flanges 18 are slidably held.

The annular member 19 is supported by pins 21 slidable through the plate 11 and fixed to a flanged collar 22 slidable on the shaft 3. This collar is held so as to be freely rotable in a yoke 23 mounted on an operating lever 24 pivoted between its ends as at 25 to a support 26.

As shown in Fig. 3 the pulley 8 is fully expanded to its maximum diameter as the annular member 19 has been moved into and remains in position to fully extend the segment 12. It should be noted that the diameter of the driving pulley 8 may be reduced from the maximum diameter as shown in Fig. 2 to any one of many lesser diameters between the minimum and said maximum and vice versa by shifting the lever 24 in the appropriate manner to move the member 19 inwardly or outwardly as the case may be. Thus the driving ratio of the pulley 8 may be varied as desired over a wide range.

Keyed on the driven shaft 5 is a driven pulley 27 identical with the pulley 8 and having its collar 28 freely rotatable and slidable on the driving shaft 3 and held in the yoke 23 for free rotation therein.

On the base 1 are bearings 29 which support countershaft 30 on which are keyed the intermediate pulleys 31 and 32 which are identical with the pulleys 8 and 27. These pulleys have the connections as indicated at 33 with a yoke 34 which is secured to the operating lever 24. A belt 35 extends around pulleys 8 and 31 whereas a similar belt 36 connects the pulleys 32 and 27.

The arrangement of the several pulleys and the operating means therefor is for example as shown in Fig. 2 so that when the lever 24 is in one extreme position, the pulley 8 will have a maximum diameter and pulley 31 driven thereby through belt 35 will be reduced to minimum diameter, whereas pulley 32 is at maximum diameter and driven pulley 27 is at minimum diameter. In this position the driven pulley 27 and shaft 5 will be operated at maximum speed whereas obviously the driven pulley 27 will be operated at minimum speed when the lever 24 is moved to its other extreme position from that shown in Fig. 2 due to the fact that the conditions of the pulleys are reversed. However it is seen that a great number of different speeds may be provided between said maximum and minimum speeds by making slight adjustments of the lever 24 and correspondingly changing the diameters of said pulley but slightly. By these means I am able to apply the power to meet the load requirements in a particularly efficient manner and to provide a smoothly operated engine or apparatus. It should be noted that this apparatus is applicable to automobiles or any other machine wherein a minutely controlled transmission of power and a great number of different speeds are required.

While I have shown the transmission as made up of pulleys I wish it understood that other forms of transmission members or gears could be used within the scope of this invention.

I claim:

Variable speed apparatus, including a rotary shaft, a pulley thereon including an annular member movable axially of and splined on said shaft, a circular series of arcuate and overlapping segments surrounding said annular member and shaft and being radially movable relative thereto for increasing and decreasing the diameter of said pulley, radial vanes fixed to said segments at points between opposed edges of the segments and having inclined edges disposed for sliding contact with said annular member, said annular member having radial slots, portions on said vanes slidably engaged in said slots, side member having radial slots therein, said vanes extending outwardly from other opposed edges of said segments, said extended portions of said vanes being slidable in the slots in said side members, and means for moving said annular member axially for radially moving said vanes and segments.

TOSHIO YAMANAKA.